United States Patent [19]

Frank

[11] 4,069,097

[45] Jan. 17, 1978

[54] METHOD AND APPARATUS FOR MONITORING FLUX DEVIATIONS IN A NUCLEAR REACTOR

[75] Inventor: Fred J. Frank, Murrysville, Pa.

[73] Assignee: Westinghouse Electric Corporation, Pittsburgh, Pa.

[21] Appl. No.: 630,875

[22] Filed: Nov. 11, 1975

[51] Int. Cl.² .......................... G21C 7/06; G21C 7/00
[52] U.S. Cl. .................................. 176/22; 176/19 R; 176/24
[58] Field of Search .................. 176/19 R, 19 J, 22, 176/24

[56] References Cited

U.S. PATENT DOCUMENTS

| 3,219,939 | 11/1965 | Vincent | 176/19 J |
| 3,423,285 | 1/1969 | Curry | 176/24 |
| 3,752,735 | 8/1973 | Musick | 176/24 |
| 3,886,333 | 5/1975 | Cohn | 176/19 R |

Primary Examiner—Samuel W. Engle
Assistant Examiner—Donald P. Walsh
Attorney, Agent, or Firm—Z. L. Dermer; D. C. Abeles

[57] ABSTRACT

A method and apparatus for sensitively monitoring flux deviations along a given core plane of a nuclear reactor as detected by a plurality of flux sensitive detectors positioned around the periphery of the core within the monitoring plane. The detector responses are averaged and the respective detector outputs exceeding the average are summed and compared to a preselected design setpoint. Sums of the detector outputs exceeding the setpoint are annunciated alerting the plant operator to take corrective action to avoid surpassing design limits.

14 Claims, 6 Drawing Figures

METHOD AND APPARATUS FOR MONITORING FLUX DEVIATIONS IN A NUCLEAR REACTOR

BACKGROUND OF THE INVENTION

This invention pertains generally to nuclear reactor flux monitors, and more particularly to flux deviation monitors employed to alarm radial flux maldistributions within the core of a nuclear reactor.

Recent developments in pressurized water reactors, when considered in combination, may compromise the ease of plant operation or operation at the maximum permitted power level. These developments require decreased margins of the design hot channel factors and have established an awareness that the percent increase in hot channel factors per percent increase in indicated radial tilt can be larger than assumed in the design phase of a plant. The aforegoing, as determined by reactor plant start-up measurements, can require the flux deviation alarm setpoint, which is employed to annunciate radial power maldistributions, to be set at such a low level that spurious alarms can be tripped due to normal instrumentation drift.

The hot channel factors are design parameters of the core which include: the heat flux hot channel factor, $F_Q^T$, which is defined as the maximum local heat flux on the surface of a fuel rod divided by the average fuel rod heat flux; the nuclear heat flux hot channel factor, $F_Q^N$, which is defined as the maximum local fuel rod linear power density divided by the average fuel rod linear power density; the engineering heat flux hot channel factor, $F_Q^E$, which is the allowance on heat flux required for manufacturing tolerances to compensate for local variations in enrichment, pellet density and diameter, surface area of the fuel rod and eccentricity of the gap between the pellet and the cladding; the nuclear enthalpy rise hot channel factor, $F_{\Delta H}^N$, which is defined as the ratio of the integral of linear power along the rod with the highest integrated power to the average rod power; and the engineering nuclear enthalpy rise hot channel factor, $F_{\Delta H}^E$, which is the allowance on enthalpy rise required for the effects of flow conditions and fabrication tolerances on the hot channel enthalpy rise. It can therefore be appreciated that the total heat flux hot channel factor, $F_Q^T$, is the product of $F_Q^N$ and $F_Q^E$, and the total enthalpy rise hot channel factor, $F_{\Delta H}^T$, is the product of $F_{\Delta H}^N$ and $F_{\Delta H}^E$.

The aforegoing design parameters, which will govern to a degree the limits of reactor plant operation, are initially calculated using analytical models and confirmed or modified in accordance with the results obtained from in-core flux monitoring measurements performed during reactor testing at start-up using movable in-core flux monitoring systems such as the system described in Application Ser. No. 379,159, entitled "A Method of Automatically Monitoring The Power Distribution Of A Nuclear Reactor Employing Movable In-Core Detectors", by James J. Loving, Jr., filed July 13, 1973. During reactor plant operation, operation within design limits is assured by constant surveillance of the in-core power distribution using the excore power range detector system. This system provides information on the axial and radial core power distribution and alarm maldistributions which are commonly referred to as tilts.

One type of flux deviation alarm system presently in use employs four excore detectors which are equidistantly positioned around the periphery of the core, external of the reactor pressure vessel. Thus, each detector provides flux information on a corresponding quadrant of the core. In addition, each detector is divided into an upper and lower section which respectively provide corresponding flux data for the upper and lower sections of the corresponding monitored quadrant. The detector outputs are communicated to a flux deviation alarm circuit which annunciates an alarm when a given quadrant section of the core exhibits a positive flux deviation from the average flux level for the corresponding half of the core. That is, an alarm is annunciated when any upper detector channel experiences a high positive flux deviation from the average of the upper detector channels, or when any lower detector channel experiences a high positive flux deviation from the average of the lower channels. The alarms are arranged to trip over the range of 50–120% of rated power and are cut off below 50%. The alarm can be set to trip on a deviation of from 0 to 20%.

The flux deviation alarm setpoints are calculated from the design and start-up information and set at a low level to alert the reactor plant operator to an abnormal quadrant power tilt in time to take corrective action. The object is to insure that the steady state hot channel factors are within the design and safety limits. However, as previously stated, recent developments in pressurized water reactors have required the alarm setpoint to be set at such a low level that spurious alarms are likely due to normal instrumentation drift.

In addition to the susceptibility to spurious alarms, the present system is relatively insensitive to core radial maldistributions within proximity of the minor axis of the core which divides the core quadrants. This means that while the measured tilt may be within design limits, maldistributions within the area of the minor axis can exceed design limits.

Accordingly, an improved method and apparatus is desired that can more sensitively monitor axial flux deviations within the core. In addition, the method and apparatus desired should have a low susceptibility to spurious alarms.

SUMMARY OF THE INVENTION

Briefly, this invention overcomes the difficulties experienced by the prior art in monitoring flux maldistributions within a given plane of the reactor core by averaging the outputs of a plurality of power responsive detectors positioned around the core in the given plane. The outputs of the respective detectors deviating in a given direction from the average are summed and compared to a designed setpoint representative of the desired upper limit for the radial tilt. Differences in the sum and average exceeding the setpoint are annunciated to alert the plant operator to take corrective action to realign an undersirable core power maldistribution.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Figure 1:
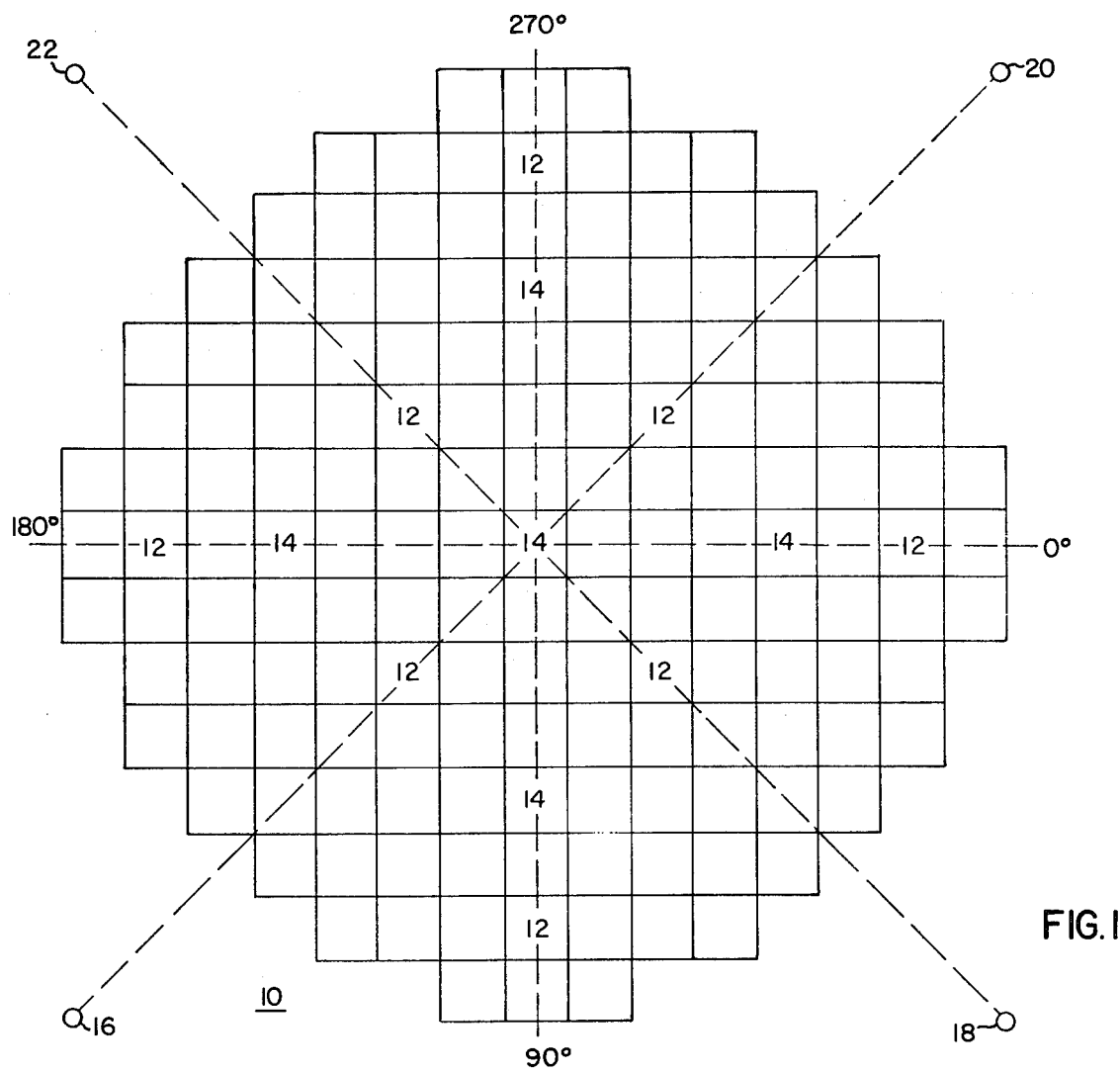
FIG. 1 is a plan view of a reactor core.

FIG. 1 illustrates a plan view of a typical pressurized water reactor nuclear core 10. The core locations identified by reference characters 12 and 14, respectively refer to full length and part length control rod locations employed during full power operation. The remaining core locations 24 generally refer to the fuel assembly positions with some positions reserved for other control applications. It can thus be appreciated that the reactor core is designed to be symmetrical about its central axis. During more than 50% power operation the power in the core is monitored by a plurality of excore detectors 16, 18, 20 and 22 symmetrically positioned around the periphery of the vessel. Each detector provides corresponding flux information on an adjacent quadrant of the core. Thus, the flux measurements detected by detector 20 are representative of the power generated in the core quadrant bounded by the 0° axis and the 270° axis.

Flux maldistributions in the core are presently determined by analyzing radial tilt measurements which are computed by comparing the individual detector outputs with the average of all the detector outputs for the corresponding core level. Increases in the radial tilt measurements corresponding to a given detector location is presently considered representative of increases in hot channel factors in the corresponding quadrant of the core. While the individual tilt measurements thus obtained are relatively sensitive to localized maldistributions occurring as a result of dropped or ejected or misaligned rods adjacent the major axis drawn between diametrically opposed detectors, this form of tilt measurement is relatively insensitive to maldistributions occurring adjacent the minor axes defined by the lines illustrated in FIG. 1 drawn between the 0° and 180° location, and the 90° and 270° location. Thus, a more sensitive measurement is desired that is more responsive to maldistributions throughout the core locations.

Figure 2:
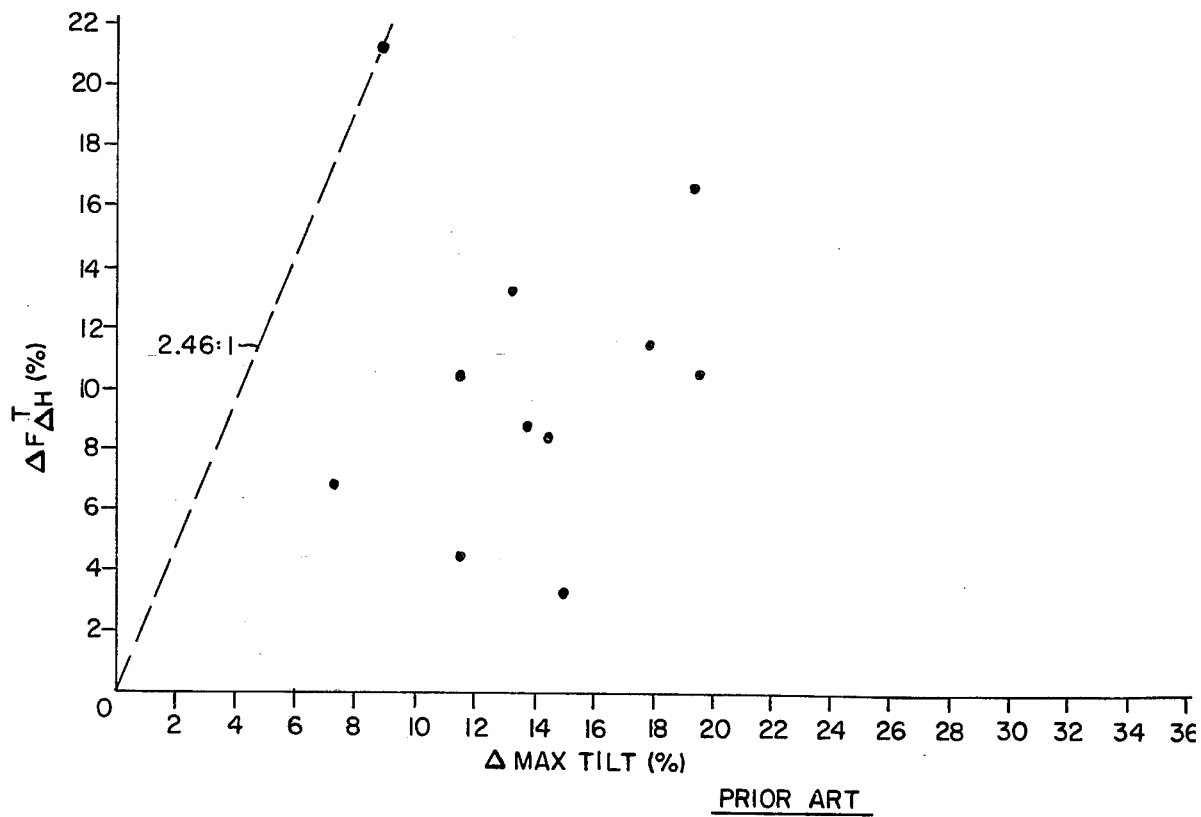
FIG. 2 is a graphical representation of the percent change in a hot channel factor vs. the percent change in radial tilt as measured by the prior art.

FIG. 2 illustrates measurements obtained during testing of a representative reactor plant, which correlate changes in a hot channel factor to percent change in tilt as calculated by the method of the prior art. The measurements were obtained during the start-up program of the plant with various single control rod units statically dropped and ejected. The resulting increase in hot channel factors was compared with the change in tilt as indicated by the excore detectors. As expected, the limiting case occurred when a control rod unit located along the minor axis was statically ejected from the core. An ejected rob results in a larger increase in hot channel factors than does a dropped rod. The result of these measurements is an envelope with a 2.46% increase in hot channel factors per percent increase in tilt as indicated by the calibrated excore detector response.

Figure 4:
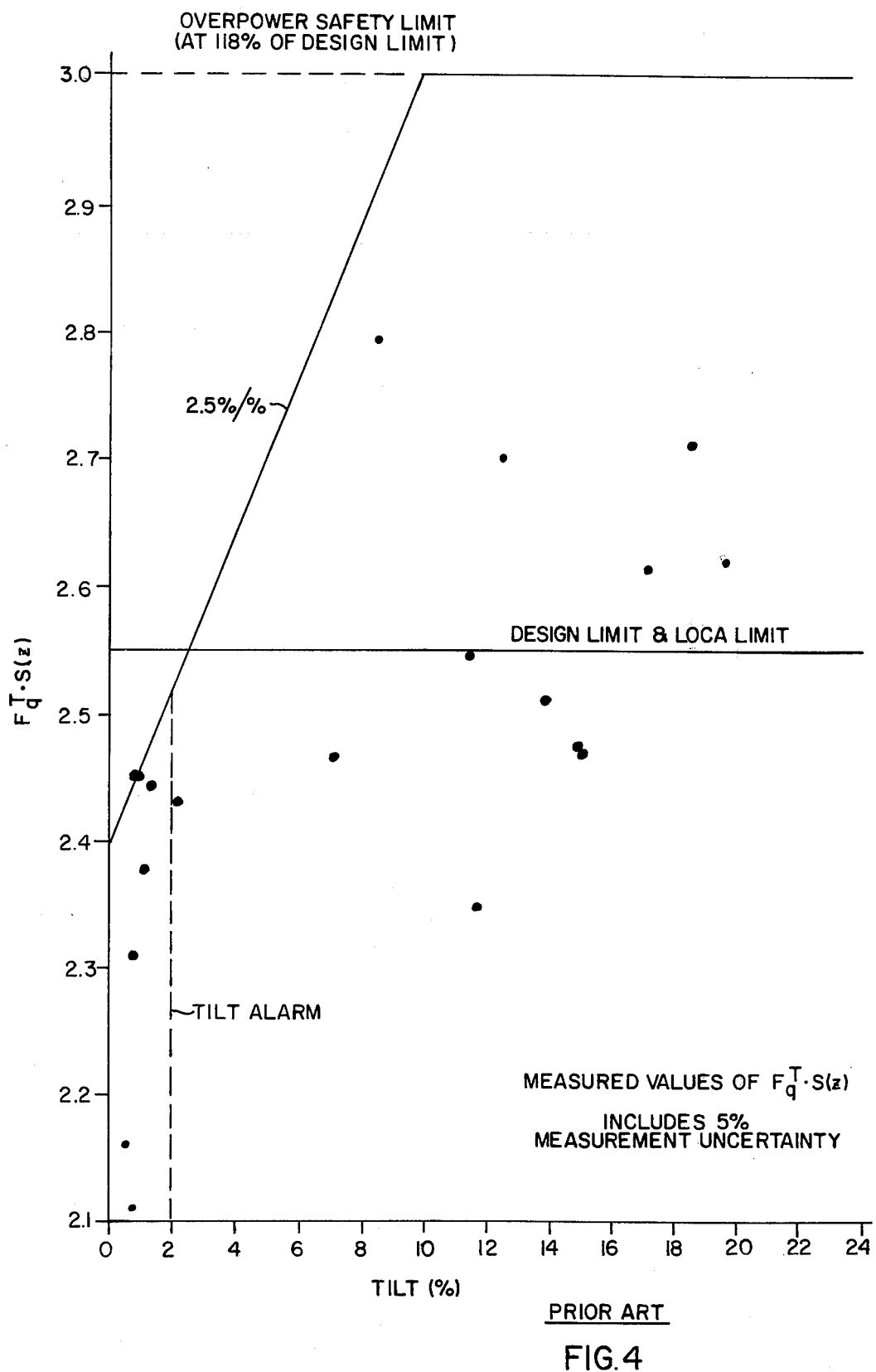
FIG. 4 is an exemplary graphical repesentation of the measured change in a hot channel factor vs. percent change in radial tilt measured by the prior art for a representative reactor plant.

Previous allowance for this envelope was a slope of 2% per percent. The application of this envelope in the establishment of the tilt alarm setpoint is shown in FIG. 4 where the measured hot channel factors for both normal and abnormal configurations are plotted versus tilt. As indicated, a tilt beyond 2.5% may result in exceeding design limits while a tilt beyond 10% may result in exceeding safety limits. The design limits are established for steady state operation; however, it is permissible to operate above design limits for short periods of time so long as the safety limits are not exceeded. Of course, it is desirable to stay below design limits as much as possible. Since the flux deviation alarm must be set to alert the operator prior to exceeding design limits, an alarm setting of 2% is specified rendering the system susceptible to spurious alarms from instrumentation drift.

In accordance with this invention, a flux deviation alarm arrangement is provided which increases detector sensitivity to quadrant power tilts and provides increased margin between normal instrumentation drift and the alarm setpoint as well as increased margin between the alarm setpoint and the tilt value which results in exceeding design hot channel factors. This increased sensitivity is obtained by summing the tilts calculated from the respective detector outputs which exceed the corresponding average of the detector outputs from the upper or lower sections of the excore detectors rather than rely on tilt variations of any one excore detector section. The result of this method is that the limiting increase in hot channel factor per increase in detector response can be reduced by approximately a factor of two. In addition, the margin between the normal variation of the sum of those detector responses exceeding the average and the alarm setpoint can be increased since the probability of more than one detector responding with a tilt large enough to trip the alarm is less. Thus, it can be appreciated that even in the worst case design where a maldistribution appears along the minor axis of the core, the method of this invention will be more sensitive to the maldistribution since the tilt will be evaluated using the outputs from at least those two detectors adjacent the minor axis.

Figure 3:
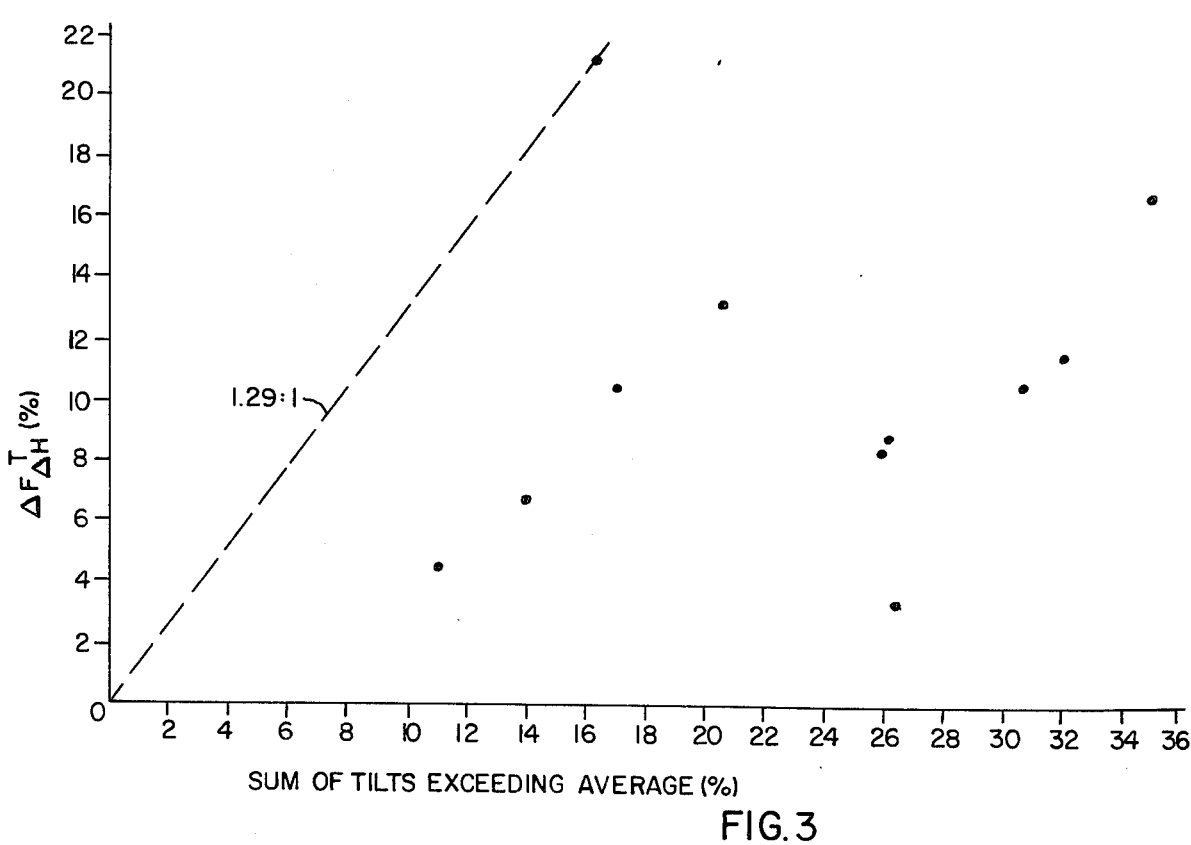
FIG. 3 is an exemplary graphical representation of the percentage change in a hot channel factor vs. percent change in the radial tilt as measured by the method and apparatus of this invention.

As an illustration of the increased sensitivity of the flux deviation system of this invention, the same representative plant measurements used previously were calculated in accordance with this invention. The results are shown in FIG. 3 and can be compared directly to the results achieved using the method of the prior art illustrated in FIG. 2. As indicated, the limiting slope of 2.46% per percent is reduced to 1.29% per percent. Thus, the method of this invention provides a radial tilt measurement which is more sensitive to increases in the hot channel factors.

Figure 5:
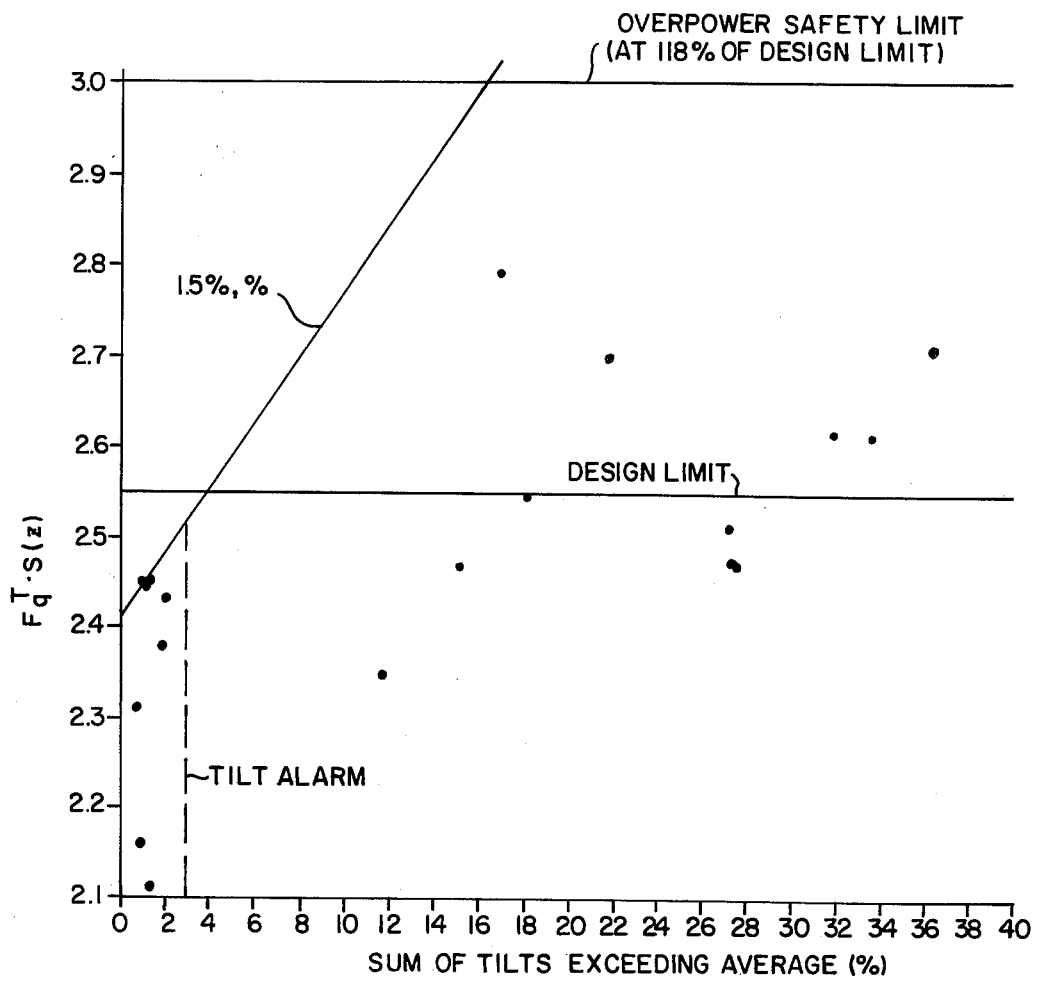
FIG. 5 is a graphical representation of the measured variation in a hot channel factor vs. the percent change in radial tilt as measured by the method and apparatus of this invention for a representative reactor plant; and, FIG. 6 is a schematic circuitry diagram of one embodiment of the apparatus of this invention.

The tilt alarm setpoint specified in accordance with the method of this invention is shown in FIG. 5 for the particular example previously used. It should be appreciated from the aforegoing that the measurements indicated on the graph were obtained from incore flux monitors at start-up. However, it should be further appreciated that the in-core measurements could not be relied on during full power operation for detecting abnormal flux tilts because they require a lengthy process of data reduction, which would not enable corrective action to be taken before design limits are exceeded. Referring to FIG. 5, it can be seen that an envelope with a 1.5:1 slope is used for added margin. As shown, the design hot channel factors may be exceeded when the sum of the tilts exceeding the average exceed 4% (as compared to the 2.5% in the prior art arrangement), while the safety limits may be exceeded when the sum of the tilts exceeding the average exceed 16% (as compared with the 10% in the prior art arrangement). It should also be noted that with an alarm setpoint of 3%, a comparison of FIGS. 4 and 5 indicates more margin in the flux deviation arrangement of this invention between the normal variation and alarm setpoint as well as between the alarm setpoint and the point at which the design hot channel factors may be exceeded.

Figure 6:
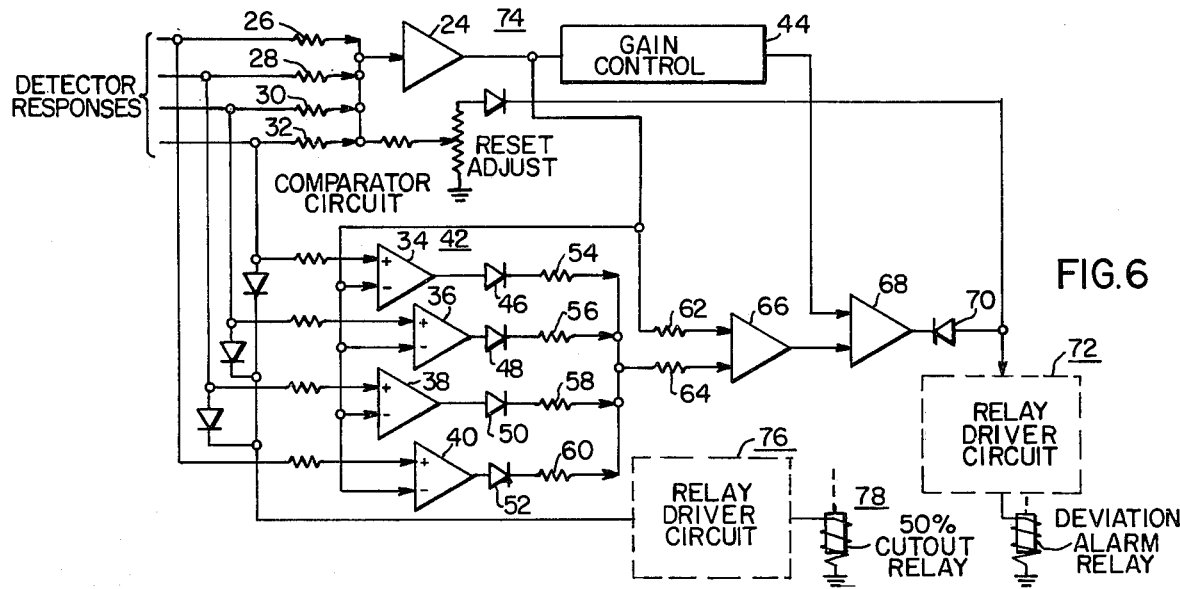

A schematic diagram of an exemplary circuit arrangement which can be employed for carrying out the steps of the method of this invention is shown in FIG. 6. This particular arrangement is similar to present flux deviation circuits with the exception of a comparison of the sum of the tilts exceeding the average with an alarm setpoint.

The outputs from the four upper or lower sections of the detectors illustrated in FIG. 1 are fed into an averaging amplifier 24 through resistors 26, 28, 30 and 32 and into each of the positive inputs of the four corresponding differential amplifiers 34, 36, 38 and 40 of the comparator section 42. An adjustable gain control which forms a portion of the gain control amplifier circuit 44 varies the trip point of the circuit. The output of the averaging amplifier 24 is applied to the negative input of each of the differential amplifiers 34, 36, 38 and 40 where a comparison is made with the individual detector outputs. The output of diodes 46, 48, 50 and 52 permit only positive outputs from the differential amplifiers to be summed by the summing resistors 54, 56, 58 and 60. Thus, only those detector outputs exceeding the average are summed. The output of the averaging amplifier 24 is added to the sum of the differentials of the detectors that exceed the average through resistors 62 and 64 and summing amplifier 66.

The output of the averaging amplifier 24 is also supplied to a gain control amplifier circuit 44 that includes an adjustable potentiometer which provides the desired degree of amplification of the average to achieve the desired setpoint. The gain of amplifier circuit 44, for example, is variable between 1.0 and 1.2.

The output of the gain control circuit 44, which is a set percentage above the average of the detector outputs, is compared with the output of amplifier 66 by the differential amplifier 68. When the output of amplifier 66 is positive, the output backbiases diode 70, thus enabling the deviation alarm relay 72 to be energized. If the output of amplifier 66 becomes equal to the output of the gain control circuit 44, the differential amplifier 68 outputs a negative voltage, thus forward biasing diode 70 and causing the deviation alarm relay to deenergize via the averaging circuit 74.

With all detector channels indicating below 50% power, the relay driver circuit 76 deenergizes the 50% cutout relay which disconnects the deviation alarm.

Thus, the sensitivity of the flux deviation circuit to core power maldistributions can be increased by monitoring and alarming on the sum of the tilts that exceed the average for a given section of the reactor core. In this way, the limiting envelope of percent increase in hot channel factor per percent increase in tilt can be reduced by approximately a factor of two if the limiting case is due to a control rod located on or near a minor axis of the core. The method of this invention also results in increased margin between normal deviations and the alarm setpoint as well as increased margin between the alarm setpoint and the value of the sum of those tilts exceeding the average which may result in exceeding design and safety limits.

I claim:

1. An improved method for identifying power maldistributions within a given plane of a core of a nuclear reactor comprising the steps of:
   measuring a parameter representative of the power within the core at a preset number of locations within the given plane;
   supplying an electrical output representative of the power measured at the respective preset locations;
   electrically averaging the respective measured powers;
   electrically summing the electrical outputs representative of the measured power at the respective locations which deviate in a given direction from the average measured power;
   comparing a value representative of the sum to a predetermined setpoint;
   supplying an alarm when the sum exceeds the setpoint.

2. The method of claim 1 wherein the setpoint is a preset percentage of the average power.

3. The method of claim 1 wherein the preset locations are symmetrically positioned with respect to the nuclear core.

4. The method of claim 1 wherein four preset locations are measured.

5. The method of claim 1 wherein the measuring locations are positioned external to the core.

6. The method of claim 1 wherein reactivity within the core is altered by control means movable into and out of the core along a prescribed plane of the core and wherein the given plane is perpendicular to the preselected plane.

7. The method of claim 1 wherein the summing step sums the electrical outputs representative of the measured power at the respective locations which are larger than the average measured power.

8. The method of claim 1 wherein the measured parameter is nuclear flux.

9. Apparatus for identifying maldistributions within a given plane of a core of a nuclear reactor comprising:
   a plurality of detectors positioned to measure a parameter representative of the power within the core at a preset number of locations within the given plane, each of the plurality of detectors being responsive to the measured parameter at the corresponding detector location to provide a representative electrical output;
   means for averaging the respective detector outputs;
   means for summing the respective detector outputs that deviate in a given direction from the average; and
   means for comparing the sum to a preset setpoint and annunciating a signal when the sum exceeds the setpoint.

10. The apparatus of claim 9 including means for electrically calculating the setpoint as a predetermined percentage of the average of the respective detector outputs.

11. The apparatus of claim 9 wherein the detector locations are symmetrically positioned with respect to the nuclear core.

12. The apparatus of claim 9 wherein the detectors are positioned external to the nuclear core.

13. The apparatus of claim 9 wherein the means for summing sums the respective detector outputs that exceed the average.

14. The apparatus of claim 9 wherein the measured parameter is nuclear flux.

* * * * *